No. 618,029. Patented Jan. 17, 1899.
G. M. FITCH.
EGG BEATER.
(Application filed Jan. 31, 1898.)
(No Model.)
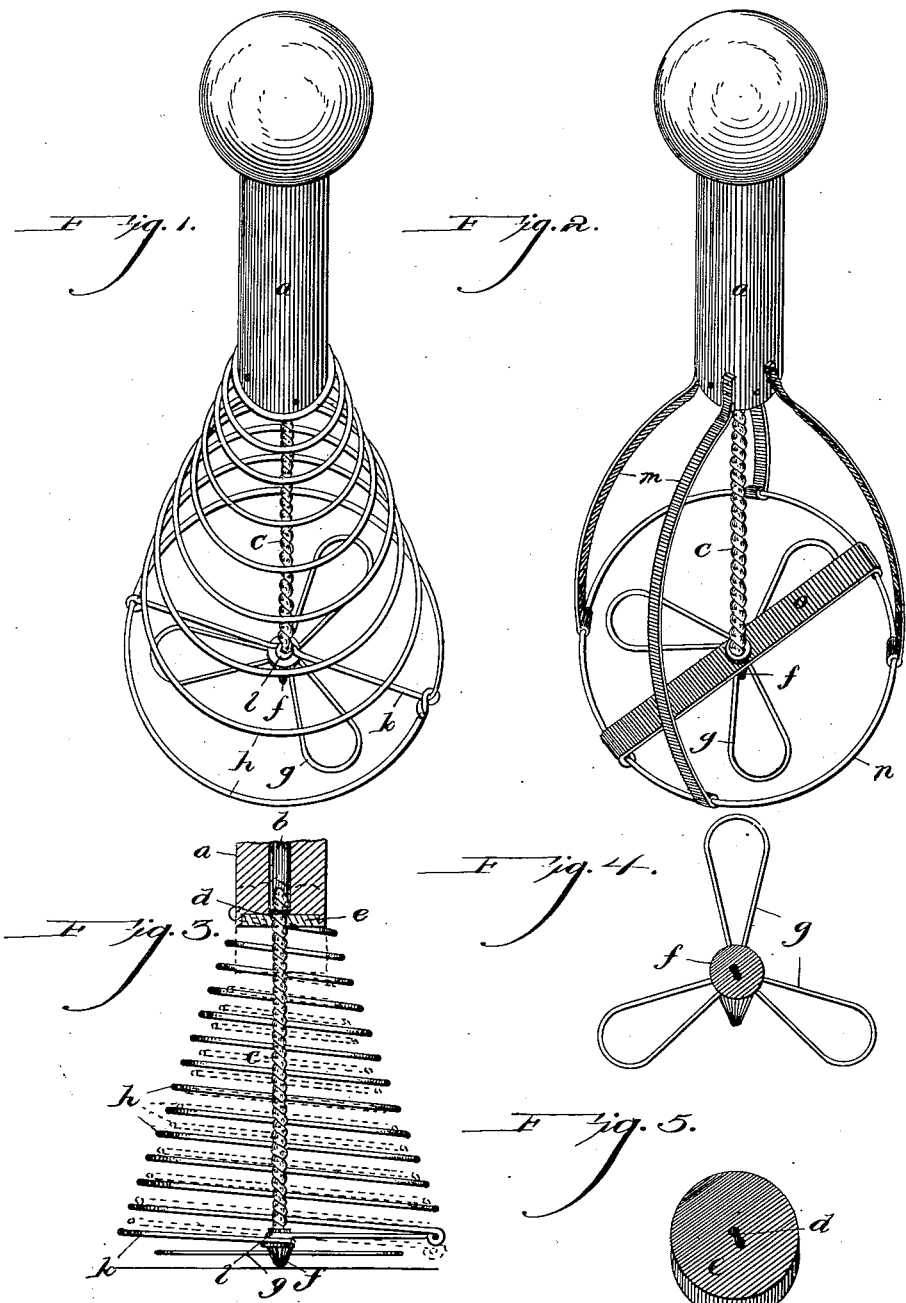
WITNESSES
INVENTOR
Gilbert M. Fitch
BY
ATTORNEYS

UNITED STATES PATENT OFFICE.

GILBERT M. FITCH, OF BEVERLY, NEW JERSEY.

EGG-BEATER.

SPECIFICATION forming part of Letters Patent No. 618,029, dated January 17, 1899.

Application filed January 31, 1898. Serial No. 668,562. (No model.)

*To all whom it may concern:*

Be it known that I, GILBERT M. FITCH, a citizen of the United States of America, residing at Beverly, in the county of Burlington and State of New Jersey, have invented certain new and useful Improvements in Egg-Beaters, of which the following is a specification, reference being had therein to the accompanying drawings.

This invention relates to certain new and useful improvements in egg-beaters; and it has for its object to provide a utensil of this nature that may be readily operated, so as to rapidly rotate the beater with one hand.

The principal features of my invention comprise a vertical shaft, which is or may be formed of two strands of wire twisted together to form a screw throughout the length of the shaft and which carries on its lower end the beaters or paddles, that are revolved through the depressing of the handle. This handle is returned to its elevated position by means of a retracting spring or springs that may be arranged in various forms and the preferred form of which will be hereinafter more fully described, and particularly pointed out in the claims.

In describing the invention in detail reference is had to the accompanying drawings, forming a part of this specification, and wherein like letters of reference indicate similar parts throughout the several views, in which—

Figure 1 is a perspective view of my improved egg-beater, showing the preferred form of the retracting-spring. Fig. 2 is a like view showing a modified form of retracting-spring. Fig. 3 is a vertical sectional view of the retracting-spring and a portion of the handle. Fig. 4 is a perspective view of the beaters or paddles. Fig. 5 is a like view of the disk or plate through which the screw-threaded rod passes and which operates the same when the rod is depressed or elevated.

Referring now to the drawings by reference-letters, $a$ represents the handle, which is or may be provided with a grip or ornamental knob on its top and is provided throughout its length with a central aperture $b$, that is adapted to receive the operating-shaft when the handle is depressed. This operating-shaft $c$ is shown in the drawings as formed from a strand of wire, which is doubled and the two strands thereby formed being twisted together, so as to form a screw-thread on the shaft, which engages in the slot or aperture $d$, conforming to the contour of the shaft $c$, that is provided therefor in the disk or plate $e$, which is secured in the lower end of the handle, said slot or aperture $d$ converging outwardly toward each of its ends, so as to permit the operating of the screw-shaft. This shaft may of course be formed of a solid piece of material and be provided with a screw-thread on its periphery, or the same operation may be accomplished by providing an exterior spirally-wound groove on the shaft and providing a disk or plate $e$ with a projection or lug to engage in the aforesaid groove. On its lower end this screw-threaded operating-shaft has attached thereto a knob $f$, which may be cone-shaped in form, with its apex downwardly, as shown in the drawings, or another suitably-shaped knob may be employed for the purpose designed. This knob or button has secured thereto the beaters or paddles $g$, which are or may be formed of bent wires secured in the knob or button or of any other suitable material and design. For the purpose of retracting the handle, and consequently revolving the shaft in the opposite direction to that in which the same was revolved when the handle was depressed, I provide a retracting-spring $h$, which in Fig. 1 is shown cone-shaped in form, with the apex thereof secured to the handle and with the wider end of the cone at or a short distance above the beaters or paddles $g$, said spring being formed with a transversely-extending rod $k$, which is looped at its center to form an eyelet $l$, through which the screw-threaded rod $c$ passes. This rod thus forms a brace for steadying the screw-threaded shaft and the beaters.

In Fig. 2 of the drawings I have shown the same form of shaft and beaters with a different form of retracting-spring. In this construction I attach to the lower end of the handle a number of flexible springs $m$, which are attached at their lower end to the annular ring $n$, surrounding the beaters, said ring $n$ carrying a transversely-extending bar $o$, forming a brace for the screw-threaded operating-shaft in order to hold the same in position.

The operation of my improved egg-beater will, it is thought, be readily apparent from the drawings, as it will be observed that when pressure is brought to bear upon the handle and the same is depressed the screw-threaded operating-shaft is revolved as the disk or plate e is forced downwardly on the same, thereby rapidly rotating the beaters. The pointed end or apex of the cone f forms a pivotal bearing for the shaft, and the transversely-extending rod k serves to retain the shaft in perfect alinement, so that the same will readily pass into the handle a without binding in the disk or plate e.

The operation of the modification shown in Fig. 2 is practically the same, the springs m doubling upon themselves as the handle is depressed, and when the pressure upon the handle is relieved the latter is elevated by the action of the springs.

In the preferred form of construction, which is that illustrated in Fig. 1, the cone-spring compresses within itself as the handle is depressed and when the pressure thereof is relieved immediately elevates the handle, thereby rapidly revolving the shaft and beaters in the opposite direction to that in which they were revolved by the depressing of the handle. The coils of the spring also act as beaters to the material as the spring is being compressed and as it is again elevating the handle.

Although the construction shown in Fig. 1 is the preferable form of my invention, yet I do not wish to limit myself to this construction, as it will be observed that the construction shown in Fig. 2 is upon the same principle, and it will also be noted that various other arrangements might be devised for completing the same operation as is accomplished by the same construction, as herein shown and described.

Having fully described my invention, what I claim as new, and desire to secure by Letters Patent, is—

1. In combination, a suitable handle, a screw-shaft and beater secured thereto, a cone-spring surrounding said shaft and connected to the handle, and means for rotating the shaft and beater when the handle is depressed or elevated, substantially as described.

2. In an egg-beater, the combination of the handle which is provided with a central aperture, a screw-threaded operating-shaft, a disk or plate provided with a slot or aperture conforming to the contour of the operating-shaft and through which the shaft passes, beaters carried by said shaft, a cone-shaped spring surrounding said shaft, the apex of said cone-shaped spring being connected to the lower extremity of said handle, and a rod connecting the lower portion of said cone-spring and forming an eyelet for the reception of said screw-threaded shaft, substantially as described.

3. In combination, a suitable handle, a screw-threaded shaft and beaters secured thereto, a disk or plate secured to the lower end of said handle and provided with a slot or aperture conforming to the contour of the shaft and adapted to receive and impart a rotary motion thereto, a spiral cone-shaped spring surrounding said shaft, the apex of said spiral cone-shaped spring being secured to the lower extremity of said handle and extending downwardly to a distance slightly above said beaters, substantially as described.

4. In combination with a handle having a central aperture, a disk secured to the lower end of said handle, a screw-threaded operating-shaft engaging the disk, said disk being provided with an aperture which registers with the aperture in the handle and conforms in contour to the screw-threaded shaft, beaters secured to the shaft, said shaft carrying at its end an inverted cone-shaped bearing, a spiral cone-spring surrounding said shaft, the apex of said spiral cone-spring being secured to the lower extremity of the handle, substantially as described.

In testimony whereof I affix my signature in the presence of two witnesses.

GILBERT M. FITCH.

Witnesses:
A. M. WILSON,
WILLIAM E. MINOR.